Patented Sept. 17, 1940

2,215,061

UNITED STATES PATENT OFFICE 2,215,061

COATING GLASS FABRIC

Cornelius Anthony Alt, Newburgh, N. Y., assignor to E. I. du Pont de Nemours & Company, Wilmington, Del., a corporation of Delaware No Drawing. Application February 25, 1937, Serial No. 127,792

1 Claim. (Cl. 91—68)

This invention relates to coated fabrics and methods of producing the same. It especially relates to the coating of woven glass fabrics.

It is well known that coated fabrics in which wool, cotton and the like constitute the base material are inflammable, and much time and money has been spent in an effort to secure a satisfactory method of fireproofing the same. It is also known that such coated fabrics are frequently attacked by fungi and are often deleteriously affected by actinic rays. The tendency of coated cotton fabrics to shrink has been a source of inconvenience and expense for many years. In work directed to overcoming the aforementioned difficulties, it has been found that a satisfactory product may be obtained by coating woven glass fabrics with suitable coating compositions.

The absence of a nap on glass fabrics similar to that encountered in the case of cotton fabrics, and the flaking off of fine particles of glass from the fiber surface, whereby adhering matter is loosened, has complicated the problem and retarded the development of a coated glass fabric having desirable characteristics.

This invention had for an object the production of a coated fabric which was not inflammable, which was not attacked by fungi, which was not deteriorated upon exposure to actinic rays, and which did not shrink in the manner common to cotton textiles. Another object was the preparation of a coated woven glass fabric, the coating of which was not loosened and otherwise detrimentally affected by chemical and physical changes taking place in the glass of the fabric as it aged. A still further object was the preparation of a superior type of coated woven glass fabric. A general advance in the art and other objects which will appear hereinafter are also contemplated.

It has now been found that a fabric having the aforementioned desirable properties, and accomplishing the aforementioned objects, may be prepared by coating a woven glass fabric with a coating composition selected from the group consisting of cellulose derivative coating compositions, synthetic resin coating compositions, natural resin coating compositions and protein type coating compositions.

The aforegoing objects and related ends are accomplished in the manner set out in the following description, in which are disclosed details of what is believed to be the best mode for carrying out the invention. Quantities are given in parts by weight throughout the application unless otherwise indicated.

Woven glass yarn is prepared by making glass strands having a diameter on the order of 1/20,000th of an inch, twisting these strands into a yarn and weaving the same. The twisting and weaving are carried out in the manner usually employed with cotton fibers. About 100 strands are necessary to produce a thread the size of the familiar No. 50 cotton thread. The production of the glass fibers is disclosed in United States Patents 2,068,202 and 2,068,203, dated January 19, 1937.

The coating of the woven glass fabric with the particular coating composition is carried out by processes well known to those skilled in the art, for example, by passing the fabric through a doctor knife coating head such as that disclosed in copending application, Serial Number 754,595, filed November 24, 1934 by W. T. Anderson, wherein, a uniform layer or film of coating composition is deposited on the continuous sheet material.

Illustrative specific coating compositions for this purpose follow.

Example I

| | Per cent by weight |
|---|---|
| Cellulose nitrate | 14.0 |
| Castor oil | 18.6 |
| Pigment | 23.4 |
| Ethyl acetate | 17.6 |
| Ethyl alcohol | 26.4 |

Example II

| | |
|---|---|
| Cellulose nitrate | 13.7 |
| Dibutyl phthalate | 11.4 |
| Pigment | 22.8 |
| Ethyl acetate | 20.8 |
| Ethyl alcohol | 31.3 |

Example III

| | |
|---|---|
| Cellulose nitrate | 18.7 |
| Copolymer of vinyl acetate and vinyl chloride 80-20 | 15.3 |
| Tricresyl phosphate | 16.3 |
| Methyl ethyl ketone | 28.5 |
| Ethyl acetate | 10.8 |
| Ethyl alcohol | 10.4 |

Example IV

| | |
|---|---|
| Cellulose acetate | 8.65 |
| Cellulose nitrate | 5.77 |
| Castor oil | 5.90 |
| Actone | 12.48 |
| Ethyl acetate | 36.34 |
| Denatured alcohol (2B) | 22.16 |
| Dibutyl tartrate | 8.70 |

The denatured alcohol used in the above formulation is that corresponding to Internal Revenue Bureau formula 2-B. It is an alcohol denatured with benzene by mixing the two in the ratio of 100 gallons of 95% by volume of ethyl alcohol to one-half gallon of benzene.

Example V

| | Percent by weight |
|---|---|
| Cellulose acetate | 5.76 |
| Cellulose nitrate | 8.64 |
| Castor oil | 4.80 |
| Dibutyl tartrate | 1.92 |
| Actone | 9.21 |
| Ethyl acetate | 31.79 |
| Denatured alcohol (2B) | 37.88 |

Example VI

| | |
|---|---|
| Cellulose acetate | 4.62 |
| Cellulose nitrate | 6.93 |
| Castor oil | 21.45 |
| Acetone | 8.25 |
| Ethyl acetate | 23.76 |
| Denatured alcohol (2B) | 34.99 |

Example VII

| | |
|---|---|
| Cellulose acetate | 14.0 |
| Dibutyl tartrate | 14.0 |
| Pigment | 23.4 |
| Acetone | 20.0 |
| Ethyl alcohol | 28.6 |

Example VIII

| | |
|---|---|
| Methyl methacrylate | 21.0 |
| Diethyl phthalate | 18.9 |
| Toluene | 50.1 |
| Ethyl alcohol | 10.0 |

Example IX

| | |
|---|---|
| "Vinylite 80" | 35.2 |
| Methyl ethyl ketone | 47.1 |
| Pigment | 5.9 |
| Tricresyl phosphate | 11.8 |

The "Vinylite 80" is a copolymer of vinyl acetate and vinyl chloride, in which the acetate constitutes 80% of the mixture.

Example X

| | Per cent by weight |
|---|---|
| Casein | 19.4 |
| Sulfonated castor oil | 19.4 |
| Water | 58.3 |
| Triethanolamine | 2.9 |

Example XI

| | |
|---|---|
| Cellulose nitrate | 19.4 |
| Ethyl acetate | 24.5 |
| Ethyl alcohol | 36.7 |
| Castor oil | 19.4 |

Example XII

| | |
|---|---|
| Cellulose nitrate | 17.7 |
| Castor oil | 17.7 |
| Ethyl alcohol | 33.4 |
| Ethyl acetate | 22.3 |
| Dye solution | 8.9 |

The dye solution in the above formulation consists of the following:

| | Per cent by weight |
|---|---|
| "Luxol" dye | 33.33 |
| Monoethyl ether of ethylene glycol | 66.67 |

"Luxol" is a trade name for spirit soluble dyes. These products are covered by U. S. Patent 1,674,128 issued on June 19, 1928.

The following represents a partial list of such dyes which may be used singly or in combination:

"Luxol" Fast Orange E
"Luxol" Fast Scarlet C
"Luxol" Fast Red D
"Luxol" Fast Black L
"Luxol" Fast Yellow T In the above examples calling for pigment, the following represents a partial list which may be used singly or in combination:

Bone black.
Lithopone
Zinc oxide
Titanium oxide
5% leaded zinc oxide
Chrome yellow
Chrome green
Yellow ochre
Red oxide
Ultramarine blue
"Titanox" (barium base)
"Titanox" (calcium base)

In addition to the above, lakes may also be used to advantage. Metallic flakes such as aluminum or aluminum bronze may be used to produce metallic effects. Pigments or dyes may when desired be incorporated in the above examples which do not recite pigment in the formula.

The coating compositions of Examples IV, V and VI are especially suitable for application over the various cellulose derivative type coating compositions recited in other examples to produce special surface effects.

Variations in translucency and transparency may be obtained by suitably regulating the index of refraction of the coating composition applied to the woven glass fabric. Films of coating composition having an index of refraction equal to or closely approaching that of the woven glass base fabric may be used advantageously when a coated product having a smooth surface and a suitable approach to transparency is desired. Coating compositions producing such films include suitably softened and/or plasticized cellulose derivative compositions, for example, cellulose nitrate and cellulose acetate containing compositions and alkyl or aryl esters of methacrylic acid. Other coating compositions which meet these requirements may also be used.

The character of the adherence of the cellulose derivative coating compositions, particularly in the case of cellulose nitrate compositions, to the base fabric is improved by preliminarily coating the base material with a thin continuous coat of a natural resin or a synthetic resin. The continuous film of natural or synthetic resin acts as a barrier to the alkali present in the glass fibers or on their surface, and prevents the alkali from contacting the cellulose nitrate. Such specific resins and like bodies as shellac, copal, sandarac, kauri, phenol formaldehyde condensates, urea formaldehyde condensates, polyhydric alcohol-polybasic acid (alkyd) resins, esters of acrylic acid, and methyl or higher esters of methacrylic acid, warrant special mention. These intermediate coatings may be applied by spreading the particular resin carried in a suitable solvent or suspension medium on the fabric and thereafter removing the solvent.

While cellulose nitrate and cellulose acetate have been disclosed in the specific examples, it will be understood that these are replaceable by other cellulose esters, for example, cellulose propionate and cellulose butyrate, and by cellulose ethers such as methyl cellulose, ethyl cellulose, and benzyl cellulose.

The softener for the cellulose derivative and the cellulose derivative coating composition may be of any suitable type, a great variety of which are known to those skilled in the art. Such specific types as treated or untreated vegetable and animal oils and synthetic resins merit special mention.

The compositions may be applied to the glass fabric by methods well known in the art of coating fabrics, such as by doctor knife, spray coating, roller coating, etc. In accordance with conventional coating practice, each coat may be suitably dried by passing through a heated chamber, or otherwise, before a subsequent coat is applied, in those cases where it is desired to have a film composed of a plurality of coatings.

The amount of coating applied may vary over a wide range, and will be governed largely by the weight of the glass fabric to which the coating is applied, and by the intended use of the finished product.

Woven glass fabrics are obtainable in a variety of weaves and weights. Among the types which have been found especially suitable for use in this invention are 2.10–30″–3/1 twill weave fabric (thickness .015%), and a 1.60–40″ broken twill weave fabric (thickness .015%). This twill weighs 9.12 ounces per square yard and the broken twill weighs 9.0 ounces per square yard.

The preferred form of the invention utilizes a woven glass yarn base. Felted glass yarns, i. e., non-woven yarns, are contemplated by the invention.

The coated woven glass fabrics may be embossed by methods applicable to coated cotton fabrics.

The products of this invention are suitable for such specific uses as motion picture screens, window shades, book covering material, weather-resisting tarpaulin, airplane coverings, wall coverings, window drapes, wearing apparel, outdoor upholstery material, fire-resistant sheet material, and the like. Such products have the advantages that they have high tensile strength, that they are chemically inert, that they are not weakened by actinic rays, that they are not attacked by fungi, that they do not shrink like coated cotton materials, and that they are fire-resistant.

As many apparently widely different embodiments of this invention may be made without departing from the spirit and scope thereof, it is to be understood that I do not limit myself to the specific embodiments thereof except as defined in the appended claim.

I claim:

The process which comprises coating a woven glass fabric with a composition consisting of:

| | Per cent by weight |
|---|---|
| Cellulose nitrate | 14.0 |
| Castor oil | 18.6 |
| Pigment | 23.4 |
| Ethyl acetate | 17.6 |
| Ethyl alcohol | 26.4 | and thereafter drying.

CORNELIUS ANTHONY ALT.